United States Patent

Markyvech et al.

[11] Patent Number: 6,067,871
[45] Date of Patent: May 30, 2000

[54] VARIABLE RESISTANCE SHIFT RAIL DETENT ASSEMBLY AND SHIFT CONTROL METHOD EMPLOYING SAME

[75] Inventors: Ronald K. Markyvech, Allen Park; Thomas N. Riley, Portage; Thomas G. Ore, Kalamazoo, all of Mich.

[73] Assignee: Eaton Corporation, Cleveland, Ohio

[21] Appl. No.: 09/012,880

[22] Filed: Jan. 23, 1998

Related U.S. Application Data

[63] Continuation of application No. 08/928,234, Sep. 12, 1997, abandoned.

[51] Int. Cl.[7] .............................. F16H 63/36; F16H 61/18
[52] U.S. Cl. ..................... 74/335; 74/473.24; 74/473.21; 74/473.25
[58] Field of Search ................. 74/335, 473.25, 74/473.26, 527, 473.11, 473.21, 473.23, 473.24, 473.28

[56] References Cited

U.S. PATENT DOCUMENTS

| | | | |
|---|---|---|---|
| 1,976,697 | 10/1934 | Fishburn | 74/473.24 |
| 2,767,595 | 10/1956 | Moon et al. | 74/473.25 |
| 3,945,458 | 3/1976 | Suzuki et al. | 74/473.25 X |
| 4,070,914 | 1/1978 | Reinhardt et al. | 74/473.28 X |
| 4,388,843 | 6/1983 | Teeter | 74/473.23 X |
| 4,406,356 | 9/1983 | Prince | 74/473.11 X |
| 4,441,379 | 4/1984 | Malkowski et al. | 74/473.11 X |
| 4,550,627 | 11/1985 | Lauer et al. | 74/475 |
| 4,593,580 | 6/1986 | Schulze | 74/858 |
| 4,614,126 | 9/1986 | Edelen et al. | 74/333 |
| 4,676,115 | 6/1987 | Morscheck et al. | 74/473.25 X |
| 4,920,815 | 5/1990 | Reynolds | 74/335 |
| 5,000,060 | 3/1991 | Reynolds et al. | 74/745 |
| 5,390,561 | 2/1995 | Stine | 74/337 |
| 5,569,115 | 10/1996 | Desautels et al. | 477/111 X |
| 5,661,998 | 9/1997 | Genise | 74/335 |
| 5,682,790 | 11/1997 | Genise | 74/335 |
| 5,735,771 | 4/1998 | Genise | 477/111 |
| 5,758,543 | 6/1998 | Bair | 74/473.36 |
| 5,904,635 | 5/1999 | Genise et al. | 477/111 |
| 5,974,354 | 10/1999 | Janecke et al. | 701/64 |

*Primary Examiner*—Charles A. Marmor
*Assistant Examiner*—Ankur Parekh
*Attorney, Agent, or Firm*—Howard D. Gordon

[57] ABSTRACT

A mechanical transmission system (10) is provided with a detent mechanism (156/172, 186/196) for applying a selectively variable detent resistance to disengagement of an engaged gear ratio. To provide resistance to shift lever (31) induced jumpout when no intent to shift is sensed, a greater detent resistance is provided, and to provide improved shift quality upon sensing an intent to shift, a lesser detent resistance is provided. The mechanism also may be utilized to maintain the transmission in neutral.

7 Claims, 8 Drawing Sheets

VARIABLE RESISTANCE SHIFT RAIL DETENT ASSEMBLY AND SHIFT CONTROL METHOD EMPLOYING SAME

RELATED APPLICATIONS

This application is a continuation of U.S. Ser. No. 08/928,234 now abandoned filed Sep. 12, 1997, and assigned to EATON CORPORATION, the assignee of this application.

This application is related to U.S. Ser. No. 08/646,225 filed May 6, 1996, now U.S. Pat. No. 5,758,543, entitled SHIFT LEVER ASSEMBLY FOR MINIMIZING JUMPOUT, and Ser. No. 08/902,603 filed Aug. 7, 1997, now U.S. Pat. No. 5,904,635 entitled PARTIALLY AUTOMATED LEVER-SHIFTED MECHANICAL TRANSMISSION SYSTEM, both assigned to EATON CORPORATION, the assignee of this application.

BACKGROUND OF THE INVENTION

1. Field of the Invention

The present invention relates to shift rail detent mechanisms for providing a selectively variable resistance to axial or rotational movement of a shift rail for minimizing the occurrence of jumpout. In a particular preferred embodiment, the present invention relates to such a detent mechanism for a lever-shifted transmission system having means to determine a driver intent to initiate or continue a lever shift and, upon sensing such an intent, to cause the detent mechanism to provide a decreased resistance to shift rail movement.

2. Description of the Prior Art

Manually shifted vehicular transmissions of the simple and/or compound types and of the synchronized, blocked and/or non-synchronized types are well known in the prior art, as may be seen by reference to U.S. Pat. Nos. 5,000,060 and 5,390,561, the disclosures of which are incorporated herein by reference.

The prior art manually shifted transmissions, especially as utilized for heavy-duty vehicles such as straight trucks and conventional (i.e., not cab-over-engine) tractor/semi-trailers, utilized a manually manipulated shift lever extending upwardly from a shift tower subassembly mounted directly on the transmission housing and interacted with a multiple-rail or single shift shaft shifting mechanism of the types shown in U.S. Pat. Nos. 4,455,883; 4,550,627; 4,920,815 and 5,272,931, the disclosures of which are incorporated herein by reference.

While such transmissions are widely used and commercially successful, they are not totally satisfactory, as under certain severe road conditions, the transmissions may experience shift lever-induced jumpout (i.e., unintended disengagement of a gear ratio). This situation usually is associated with transmissions utilized in relatively heavy-duty vehicles (i e., such as MVMA Class 5 and larger vehicles), which tend to have relatively long shift levers having relatively large shift knobs, often including master valving for controlling range and/or splitter shifts, at the ends thereof.

As is known in the prior art, shift rail detent mechanisms are used to maintain the shift rails in a fixed position to resist jumpout, such as shift lever-induced jumpout. Examples of such detent mechanisms may be seen by reference to U.S. Pat. Nos. 4,550,627; 4,614,126; 4,920,815; 5,000,060 and 5,350,561, the disclosures of which are incorporated herein by reference. Shift lever detents are also useful to maintain a transmission in neutral when the engine is left running to keep the heater operational. Such mechanisms are not totally satisfactory, as the magnitude of resistance to shift rail movement needed to provide a significant resistance to jumpout or to resist accidental shifting from neutral, often objectionably increased the operator effort associated with a lever shift.

Partially automated mechanical transmission systems providing automatic assistance, such as automatic engine fuel control, for manual lever-shifted transmissions are known in the prior art, as may be seen by reference to U.S. Pat. Nos. 4,593,580; 5,569,115; 5,571,059; 5,573,477 and 5,582,558, the disclosures of which are incorporated herein by reference, and to co-pending U.S. Ser. Nos. 08/649,829 now U.S. Pat. No. 5,682,790, 08/649,830 now U.S. Pat. No. 5,735,771, 08/649,831, now abandoned, and 08/666,164, all assigned to EATON CORPORATION, the assignee of this application. These systems utilize automatic engine fueling controls and/or range and/or splitter shift actuators, actuated by a driver indication of an intent to shift, allowing an old gear to be disengaged and a new or target gear to be engaged without requiring the driver to manipulate the clutch pedal (required only for vehicle launch and stop) or the throttle pedal.

SUMMARY OF THE INVENTION

In accordance with a preferred embodiment of the present invention, the drawbacks of the prior art are minimized or overcome by the provision of a selectively variable detent mechanism for a transmission system having a means for sensing a driver intent to initiate a lever shift, which provides a significant resistance to shift lever-induced jumpout without objectionably increasing the operator effort required to make an intended lever shift.

The foregoing is accomplished by providing a detent mechanism which may be controlled to a first condition for providing a greater resistance to shift rail movement or to a second condition for providing a lesser resistance to shift rail movement. Upon determining a driver intent to initiate a lever shift, and preferably until confirming engagement of a target gear ratio, the detent mechanism is caused to assume the second condition wherein detent resistance to shift rail movement (and, thus, to lever shifts) is minimized. When not at the initiation of or during a lever shift operation, the detent mechanism is caused to assume the first condition wherein a significant detent resistance to shift rail movement (and, thus, to shift lever-induced jumpout) is applied.

Alternatively, operation of the vehicle heater when the transmission is allowed to remain in neutral may cause the detent mechanism to assume the first condition.

Accordingly, it is an object of the present invention to provide a new and improved shift rail detent mechanism for mechanical transmission systems.

This and other objects and advantages of the present invention will become apparent from a reading of the following description of the preferred embodiment taken in connection with the attached drawings.

DESCRIPTION OF THE PREFERRED EMBODIMENT

Figure 1:
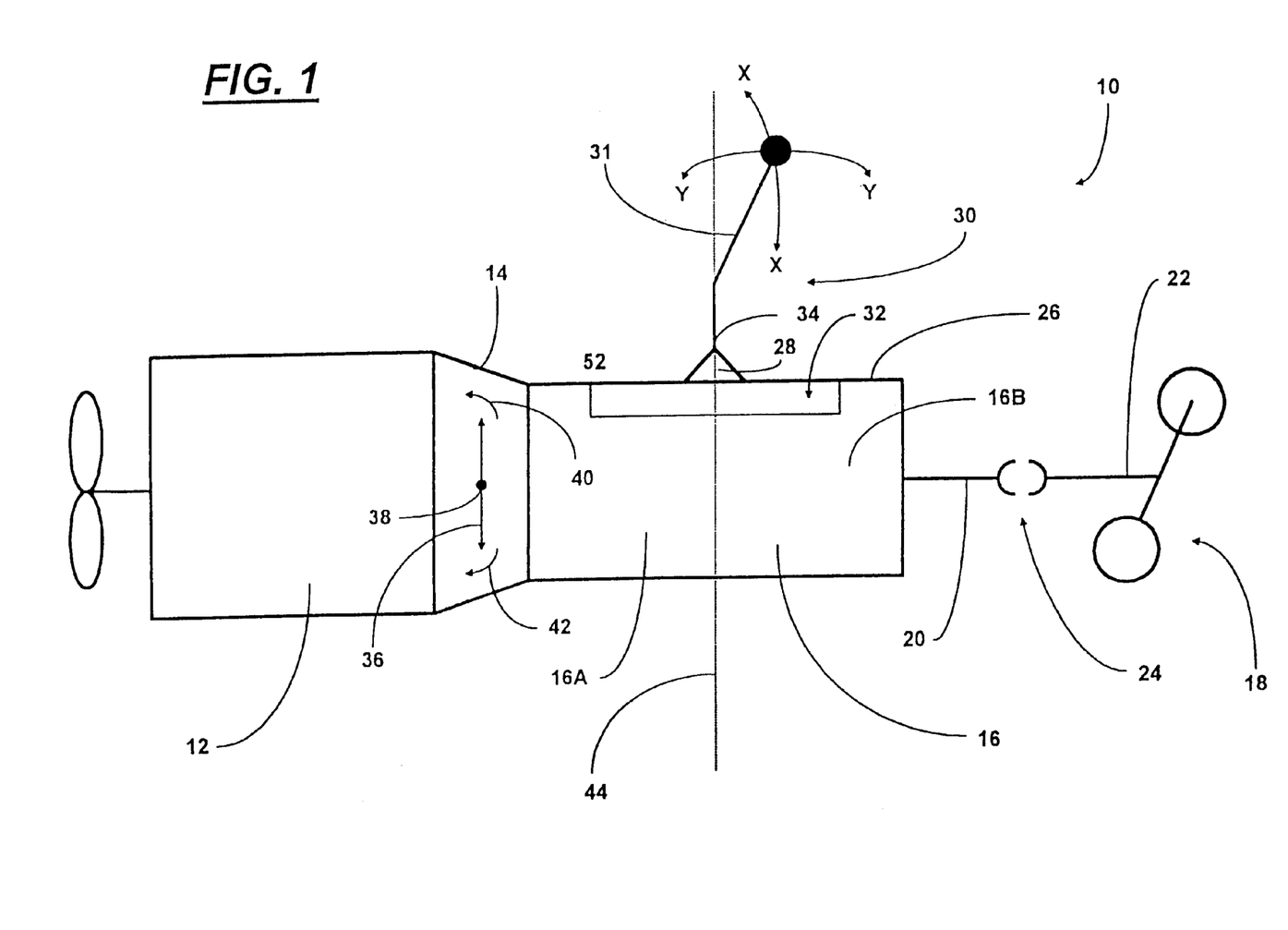
FIG. 1 is a symbolic representation of a vehicular drive line utilizing the improved shift rail detent assembly of the present invention.

Certain terminology will be used in the following description of the preferred embodiment for convenience only and will not be limiting. The terms "upward," "downward," "rightward" and "leftward" will designate directions in the drawings to which reference is made. The terms "forward" and "rearward" will refer, respectively, to the front and rear ends of the drive train components as conventionally mounted in the vehicle, being, respectively, to the left and right sides of the various drive train components, as illustrated in FIG. 1. The terms "clockwise" and "counterclockwise" will refer to rotational directions as viewed from the left side of the vehicle, as shown in FIG. 1. Said terminology includes the words above specifically mentioned, derivatives thereof and words of similar import.

The preferred embodiment of the present invention is illustrated as utilized in a partially automated, lever-shifted mechanical transmission system of the type illustrated in aforementioned U.S. Pat. Nos. 4,593,580; 5,569,115 and 5,582,558, and in aforementioned co-pending U.S. Ser. No. 08/902,603, now U.S. Pat. No. 5,904,635, entitled PARTIALLY AUTOMATED LEVER-SHIFTED MECHANICAL TRANSMISSION SYSTEM. Although the present invention is particularly advantageously utilized in such systems, its application is not so limited.

A typical vehicular powertrain system 10 advantageously utilizing the present invention may be seen by reference to FIG. 1. Powertrain 10 is of the type commonly utilized in heavy-duty vehicles, such as the conventional tractors of tractor/semi-trailer vehicles, and includes an engine, typically a diesel engine 12, a master friction clutch 14 contained within a clutch housing, a multiple-speed compound transmission 16, and a drive axle assembly 18. The transmission 16 includes an output shaft 20 drivingly coupled to a vehicle drive shaft 22 by a universal joint 24 for driving the drive axle assembly, as is well known in the prior art. The transmission 16 is housed within a transmission housing 26 to which is directly mounted the shift tower 28 of the shift lever assembly 30.

Figure 4A:
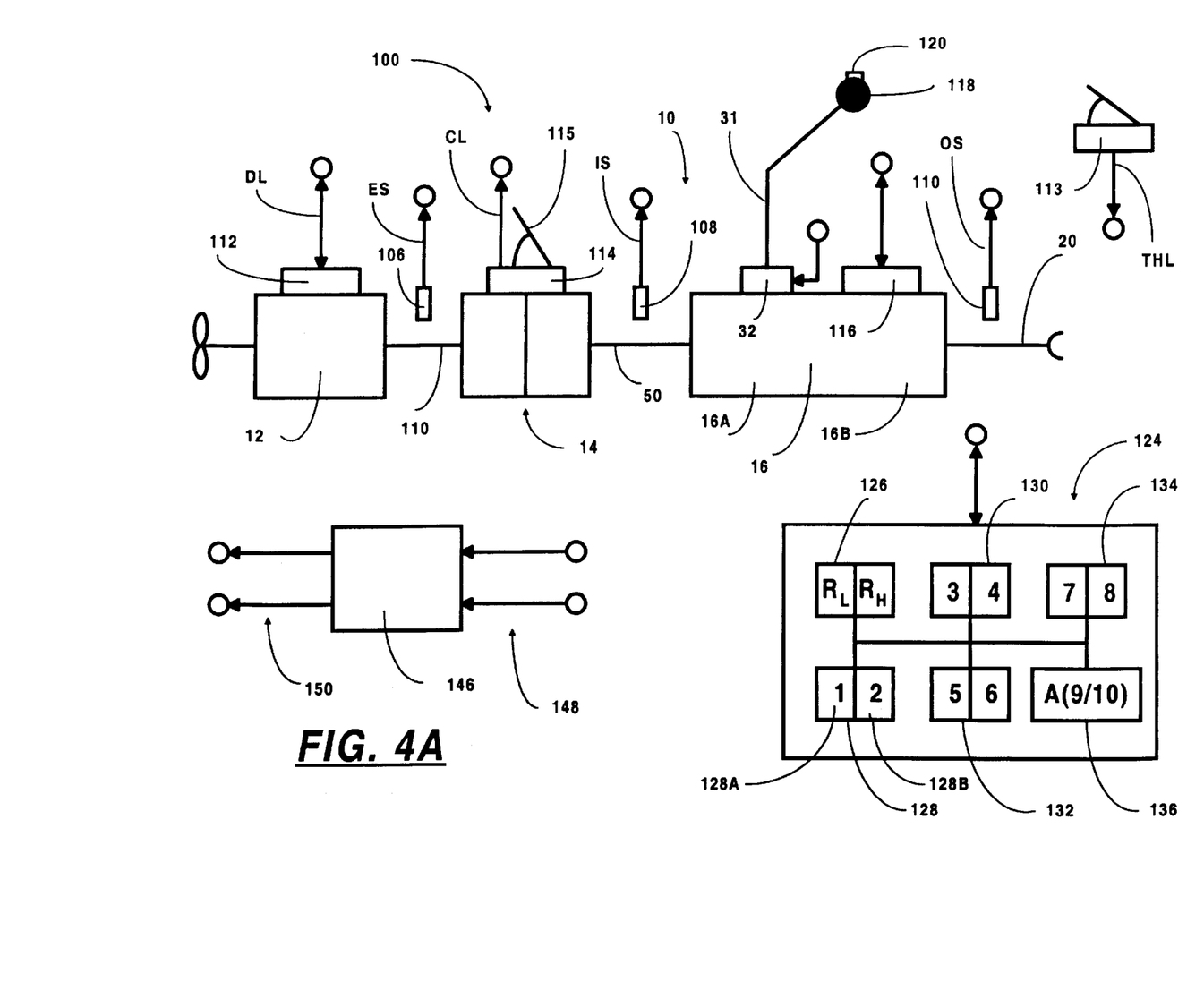
FIGS. 4A–4C are symbolic representations of a a heavy-duty, automatically assisted, manually shifted transmission system of the type advantageously utilizing the present invention.

FIG. 4A illustrates a shift pattern for assisted manual shifting of a combined range-and-splitter-type compound transmission manually shifted by a manually operated shift lever. Briefly, the shift lever 31 is movable in the side-to-side or X—X direction to select a particular ratio or ratios to be engaged and is movable in the fore and aft or Y—Y direction to selectively engage and disengage the various ratios. The shift pattern may include an automatic range shifting feature and automatically selected and/or implemented splitter shifting, as is known in the prior art. Manual transmissions utilizing shift mechanisms and shift patterns of this type are well known in the prior art and may be appreciated in greater detail by reference to aforementioned U.S. Pat. Nos. 5,000,060 and 5,390,561.

Typically, the shift lever assembly 30 will include a shift finger or the like (not shown) extending downwardly into a shifting mechanism 32, such as multiple-rail shift bar housing assembly or a single shift shaft assembly, as is well known in the prior art and as is illustrated in aforementioned U.S. Pat. Nos. 4,455,883; 4,550,627; 4,920,815 and 5,272,931.

In the prior art transmissions of the general type illustrated in FIG. 1 but not incorporating the improved shift rail detent assembly of the present invention, it is known that annoying shift lever jumpout may occur if road conditions are severe. Briefly, shift lever jumpout is the unintended disengagement of the jaw clutches of a manually shifted transmission caused by shift lever oscillations in the Y—Y direction about the Y—Y pivot axis 34 of the shift lever assembly. It is the purpose of the shift rail detent assembly of the present invention to minimize the occurrences of such shift lever-induced jumpout while not objectionably increasing shift effort.

In a typical heavy-duty vehicle powertrain, the engine-clutch-transmission assemblage will tend to move, during severe road conditions, in a vertical manner (as illustrated by arrow 36) and in a pivoting manner about a pivot point or axis 38 (usually located in the area of the vehicle clutch). As is indicated by arrow 40, an upward movement of the assemblage almost always is associated with a counterclockwise rotation of the assemblage around pivot axis 38, while, as indicated by arrow 42, a downward movement of the assemblage almost always is accompanied by a clockwise rotation of the assemblage about the pivot axis 38.

Figure 2:
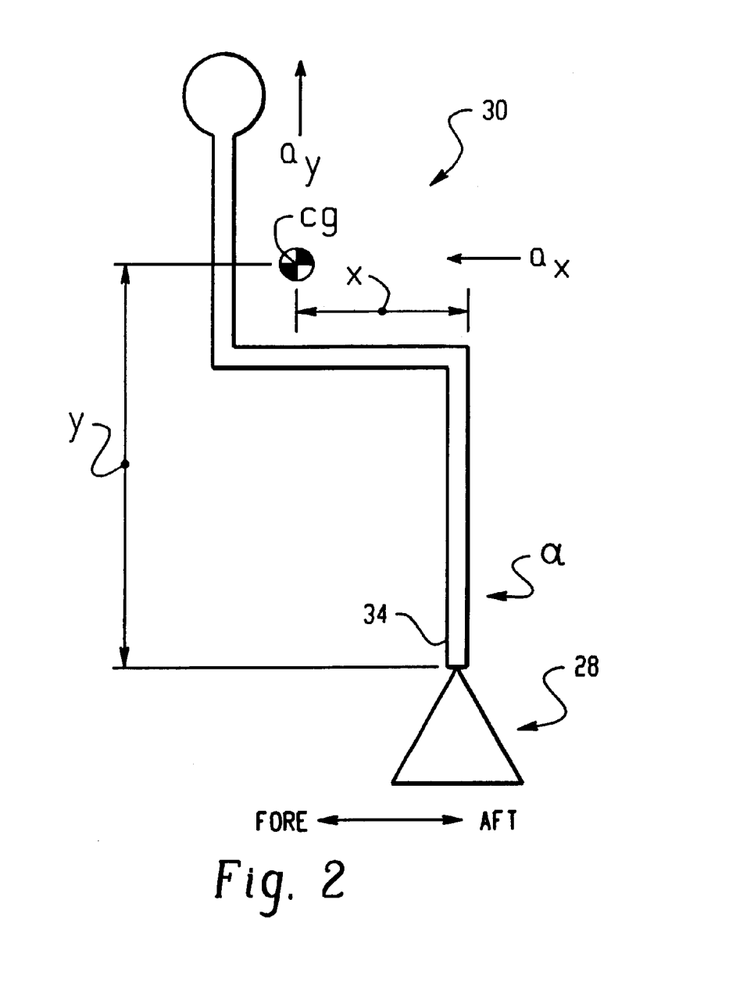
FIG. 2 is a symbolic illustration of the parameters affecting shift lever-induced jumpout torque.

As understood, shift lever-induced jumpout is forced by the inertial effects of excessive road-induced vibration in the vehicle drive train. This road-induced shock causes the engine-clutch-transmission assemblage to pitch on its mounts, as shown in FIG. 1. This pitching occurs at the natural frequency of the engine-clutch-transmission-mount system, usually between about 7 and 10 HZ. This pitching induces relatively high vertical, fore-aft and rotational accelerations on the transmission and, in particular, the shift lever assembly. The shift lever assembly then develops an inertial jumpout torque $T_j$ about its pivot 34 as determined by the sum of the inertial torques thereon, as will be described in greater detail below and as schematically illustrated in FIG. 2. It is noted that the typical rearward offset in transmission lever tends to increase the jumpout torque.

Figure 3:
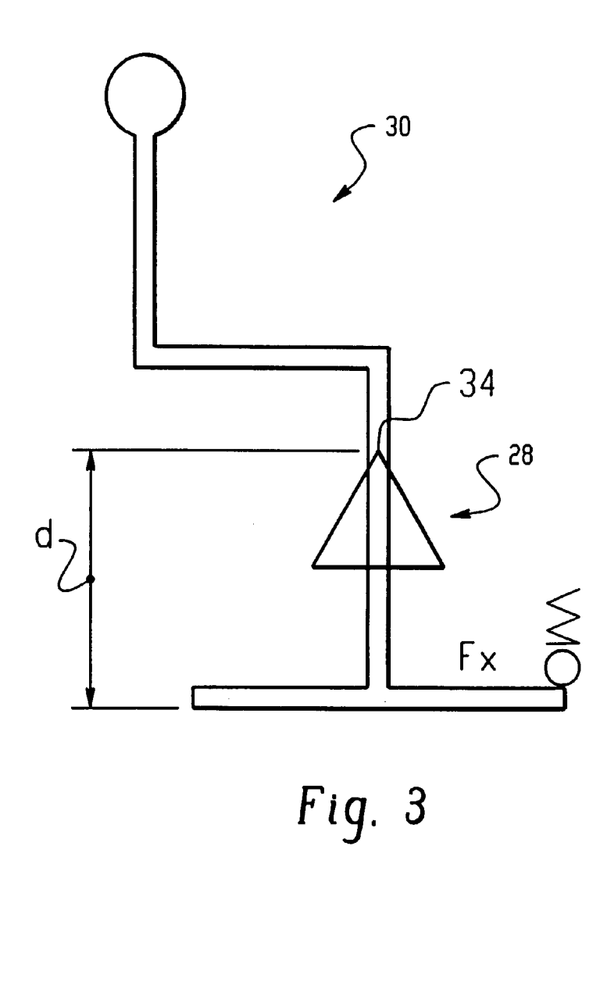
FIG. 3 is a symbolic illustration of the parameters affecting detent torque.

As will be described in greater detail below and as is schematically illustrated in FIG. 3, jumpout torque $T_j$ is resisted by the shift rail or shift shaft detent force multiplied by its moment arm determined by the distance between the pivot 34 and the shift rail or shaft (i.e., detent torque $T_0$). Detent force may include the forces required to overcome a detent mechanism, torque lock in the engaged jaw clutches, and frictional forces in the shift mechanism. When the jumpout torque overcomes the detent torque, shift lever jumpout occurs. This tends to occur when the drive train has a very low torque, such as vehicle coast conditions, since the friction from so-called torque lock in the drive train during driving conditions tends to lock the engaged sliding clutch members in engagement and greatly overcomes any jumpout forces imposed thereon.

As the shift lever assembly 30 itself is a dynamic system, it has its own natural frequency. Unfortunately, this also usually occurs between 7 and 10 HZ. This frequency is determined by lever height, lever offset, tower height, and isolator stiffness. If the natural frequency of the engine-clutch-transmission assemblage matches that of the shift lever assembly, propensity for jumpout is greater because the engine-amplified inertial forces are amplified further by the lever resonance.

In FIG. 2, $T_j = a_x My - a_y Mx + I$ where:
  $T_j$ = Jumpout torque
  M = Mass of lever
  I = Moment of inertia of lever
  $a_x$ = Fore/aft acceleration
  $a_y$ = Vertical acceleration
  = Angular acceleration of lever
  x = Distance between cg of lever and pivot
  y = Vertical distance between cg of lever and pivot
  cg = Center of gravity while in FIG. 3, $T_0 = F_x d$ where:
  $T_0$ = Detent torque
  $F_x$ = Detent force
  D = Distance between pivot and rail FIG. 2 illustrates a mathematical model for calculating the jumpout torque $T_j$ induced in a shift rail by shift lever whip. It is noted that jumpout torque will be applied in both the counterclockwise and clockwise directions about the shift lever pivot axis 34 but will tend to cause jumpout only in one of those two directions, depending upon the currently engaged gear ratio.

One method of minimizing shift lever-induced jumpout is to increase the detent force $F_x$ such that detent torque will almost always exceed jumpout torque. Unfortunately, such an increased detent force, if not relieved at the time of shifting, will result in objectionably high shift effort.

Figure 4B:
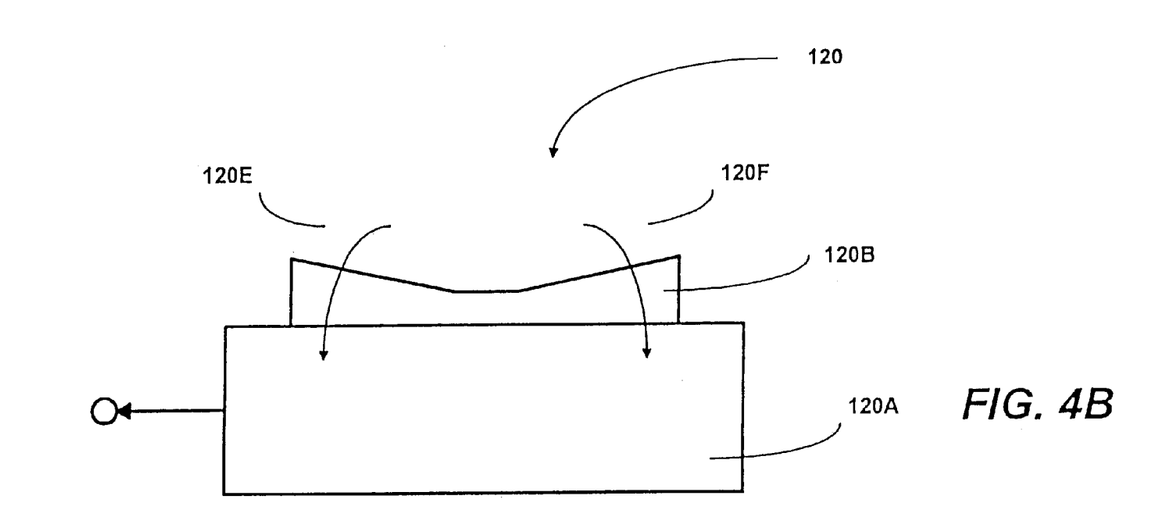
Figure 4C:
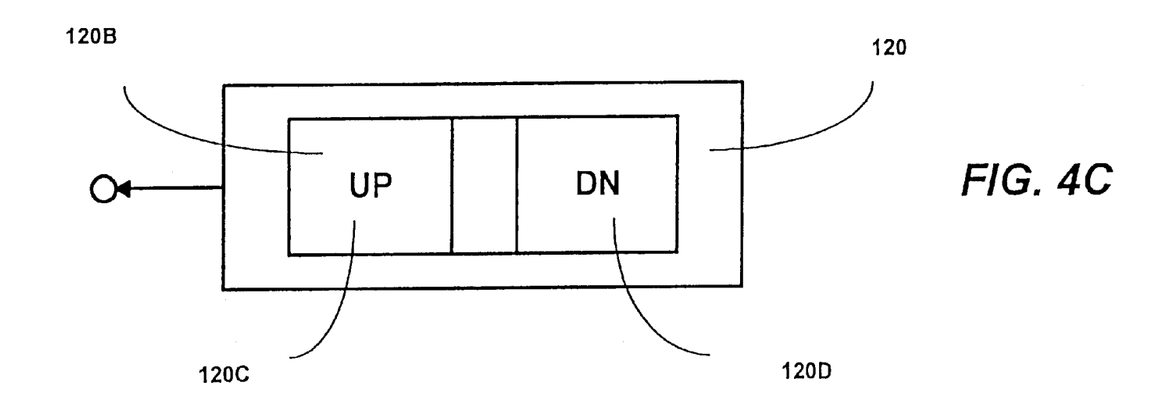

In a preferred embodiment of the present invention, the forward shifting of transmission 16, comprising main section 16A coupled to auxiliary section 16B, is semi-automatically implemented/assisted by the vehicular semi-automatic transmission system 100, illustrated in FIGS. 4A—4C. Main section 16A includes an input shaft 50, which is operatively coupled to the drive or crank shaft 110 of the vehicle engine 12 by master clutch 14, and output shaft 20 of auxiliary section 16B is operatively coupled, commonly by means of a drive shaft, to the drive wheels of the vehicle. The auxiliary section 16B is a splitter type, preferably a combined range-and-splitter type, as illustrated in U.S. Pat. No. 5,390,561.

The change-gear ratios available from main transmission section 16 are manually selectable by manually positioning the shift lever 31 according to the shift pattern prescribed to engage the particular change gear ratio of main section 16A desired. As will be described, manipulation of the master clutch (other than when bringing the vehicle to or when launching the vehicle from an at-rest condition) and manual synchronizing are not required. The system includes means to signal an intent to shift into a target ratio and will automatically take actions to minimize or relieve torque-lock conditions, allowing, if required, an easier shift into main section neutral from the engaged main section ratio and further allowing required splitter shifts to be automatically and rapidly completed upon a shift into neutral. Upon sensing a neutral condition, the system will cause the engine to rotate at a substantially synchronous speed for engaging a target gear ratio.

The system 100 includes sensors 106 for sensing engine rotational speed (ES), 108 for sensing input shaft rotational speed (IS), and 110 for sensing output shaft rotational speed (OS) and providing signals indicative thereof. As is known, with the clutch 14 engaged and the transmission engaged in a known gear ratio, ES=IS=OS*GR (see U.S. Pat. No. 4,361,060).

Engine 12 is electronically controlled, including an electronic controller 112 communicating over an electronic data link (DL) operating under an industry standard protocol such as SAE J-1922, SAE J-1939, ISO 11898 or the like. Throttle position (operator demand) is a desirable parameter for selecting shifting points and in other control logic. A separate throttle posit on sensor 113 may be provided or throttle position (THL) may be sensed from the data link. Gross engine torque ($T_{EG}$) and base engine friction torque ($T_{BEF}$) also are available on the data link.

A manual clutch pedal 115 controls the master clutch, and a sensor 114 provides a signal (CL) indicative of clutch-engaged or disengaged condition. The condition of the clutch also may be determined by comparing engine speed to input shaft speed. A splitter actuator 116 is provided for operating the splitter section clutch (not shown) in accordance with command output signals. The shift lever 31 has a knob 118 which contains selector switch 120 by which a driver's intent to shift may be sensed. A preferred embodiment of selector switch 120 may be seen by reference to FIGS. 4A–4C. Switch 120 includes a body 120A in which is pivotably mounted a rocker member 120B. The rocker is spring-biased to the centered, non-displaced position illustrated. The operator may press surface 120C or 120D of the rocker member to cause the rocker switch to be pivoted in the direction of arrows 120E or 120F, respectively, to select an up- or downshift, respectively. The rocker may be moved in the direction of the arrows and then released to provide an "up" or "down" pulse or may be moved to and retained at the "up" or "down" positions to achieve different control results, as will be described in detail below. The rocker may be used to provide multiple pulses to request a skip shift (see U.S. Pat. No. 4,648,290). Alternatively, rocker 120B may be replaced by a toggle, pressure-sensitive surfaces, separate "up" and "down" buttons, or the like.

A driver's control display unit 124 includes a graphic representation of the six-position shift pattern with individually lightable display elements 126, 128, 130, 132, 134 and 136 representing each of the selectable engagement positions. Preferably, each half of the shift pattern display elements (i.e., 128A and 128B) will be individually lightable, allowing the display to inform the driver of the lever and splitter position for the engaged and/or target ratio. In a preferred embodiment, the engaged ratio is steadily lit, while the target ratio is indicated by a flashing light.

The system includes a control unit 146, preferably a microprocessor-based control unit of the type illustrated in U.S. Pat. Nos. 4,595,986; 4,361,065 and 5,335,566, the disclosures of which are incorporated herein by reference, for receiving input signals 148 and processing same according to predetermined logic rules to issue command output signals 150 to system actuators, such as the splitter section actuator 116, the engine controller 112 and the display unit 124. A separate system controller 146 may be utilized, or the engine ECU 112 communicating over an electronic data link may be utilized.

As shown in co-pending patent application U.S. Ser. No. 08/597,304, now U.S. Pat. No. 5,661,998, the splitter actuator 116 is, preferably, a three-position device, allowing a selectable and maintainable splitter section neutral. Alternatively, a "pseudo" splitter-neutral may be provided by deenergizing the splitter actuator when the splitter clutch 80 is in an intermediate, nonengaged position.

Forward dynamic splitter-only shifts, other than for the more fully automatic 9-10 and 10-9 splitter shifts, such as third-to-fourth and fourth-to-third shifts, are automatically implemented upon driver request by use of the selector switch 120. By way of example, assuming a three-position splitter actuator, upon sensing that a splitter shift is required, by receiving a single "up" signal when engaged in first, third, fifth of seventh, or receiving a single "down" signal when engaged in second, fourth, sixth or eighth, the ECU 146 will issue commands to the actuator 116 to bias the actuator toward neutral, and to engine controller 112 to minimize or break torque. This may be accomplished by causing the engine to dither about a zero flywheel torque value (see aforementioned U.S. Pat. No. 4,850,236). As soon as splitter neutral is sensed, the engine will be commanded to a substantially synchronous engine speed for the target gear ratio at current output shaft speed ($ES=IS=OS*GR_T \pm E_{RROR}$). The engagement is timed, in view of reaction times and shaft speeds and accelerations, to occur just off synchronous to prevent clutch butting. Automatic splitter shifting of this general type is illustrated in aforementioned U.S. Pat. Nos. 4,722,248 and 5,435,212.

The more fully automated 9-10 and 10-9 splitter shifts are implemented in the same manner but are initiated by the ECU, not the selector switch 120, in accordance with predetermined shift schedules.

The engaged and neutral (not engaged) conditions of transmission 10 may be sensed by comparing the input shaft/output shaft rotational speeds to known gear ratios ($IS/OS=GR_{i-1 \text{ to } 10} \pm Y$?) for a period of time. Position sensors may be utilized in lieu of or in addition to input shaft and output shaft speed logic.

When synchronizing to engage a target ratio, the engine is directed to achieve and remain at a speed about 30 to 100 RPM (preferably about 60 RPM) above or below (preferably below) true synchronous speed ($ES_{SYNCHRO}=(OS \times GR_T)-45$ RPM) to achieve a good quality jaw clutch engagement without butting. To verify engagement of a target ratio, the system looks for input shaft speed equaling the product of output shaft speed and the numerical value of the target ratio, plus or minus about 10 to 30 RPM ($IS=(OS*GR_T) \pm 20$ RPM) for a period of time, about 100 to 400 milliseconds.

The foregoing logic allows transmission engaged and neutral conditions to be determined on the basis of input and output shaft speeds without false engagement sensing caused by engine synchronizing for engagement of a target ratio (see co-pending U.S. Ser. No. 08/790,210, now U.S. Pat. No. 5,974,354).

When in an even numbered ratio (i.e., when in the high splitter ratio) and a single upshift is required, a lever upshift (with splitter downshift) is appropriate and the system, if requested by the driver, will automatically assist in implementing same. Similarly, when in an odd numbered ratio (i.e., when in the low splitter ratio) and a single downshift is requested, a lever downshift (with splitter upshift) is appropriate and the system, if requested by the driver, will automatically assist in implementing same. It is noted that in system 100, splitter-only shifts may be automatically implemented, while lever shifts, with accompanying splitter shifts, require driver initiation and main section jaw clutch manipulation.

When a combined lever-and-splitter shift is requested, a single pulse of the selector in the appropriate direction (as opposed to maintaining the rocker 120B in the appropriate displaced position) is taken as simply a request for an appropriate splitter shift with no automatic assistance, and the splitter will be preselected to shift to the appropriate splitter position and will do so when the operator manually shifts to neutral or otherwise breaks torque. The driver is then required to engage the appropriate main section ratio without intervention by the controller 148. This is substantially identical to the operation of a fully manual splitter-type transmission.

If the driver wishes automatic assistance for a combined lever-and-splitter shift, the rocker member 120B of the selector is moved to and retained (for at least 50 milliseconds to 1 second) in the appropriate position to request an assisted up- or downshift. The controller 148, upon receiving such a request, will automatically cause (for a period of about 2–5 seconds) the engine to be fueled to dither about a zero flywheel torque, thereby reducing or eliminating torque lock conditions and allowing the operator to easily manually shift to main section neutral (see U.S. Pat. Nos. 4,850,236 and 5,573,477). The display 124 will steadily light the old gear ratio and flash or otherwise indicate the selected ratio. The ECU 148 will sense for neutral conditions by comparing the ratio of input shaft speed (IS) to output shaft speed OS) to known gear ratios. Alternatively or in combination, position sensors may be utilized. The logic will determine the identity of the target gear ratio $GR_T$ as a direct or indirect function of current gear ratio $GR_C$ and the direction of the requested shift.

When main section neutral is sensed, the display element corresponding to the disengaged gear ratio will not be lighted, the splitter will automatically be caused to shift to the appropriate splitter ratio and the engine will automatically be caused (for a period of about 2–5 seconds) to rotate at a substantially synchronous speed ($ES=OS*GR_T$) for engaging the target gear ratio ($GR_T$), allowing the operator to easily manually utilize the shift lever 31 to engage the indicated main section ratio. Preferably, the engine will automatically be caused to rotate at an offset from or to dither about true synchronous speed (see U.S. Pat. Nos. 5,508,916 and 5,582,558). Upon sensing engagement of the target ratio, the display indicator element corresponding to the newly engaged ratio will be steadily lit and engine fuel control will be returned to the operator. The assisted combined lever and splitter shift is accomplished without requiring the operator to manipulate the clutch pedal 115 or the throttle pedal 113.

When in or after shifted to the "A" position 136 (i.e., 9/10), the ECU 146 will command the fuel controller 112 and splitter operator 116 to automatically select and implement appropriate 9-10 and 10-9 shifts. Automatic operation within an upper group of ratios is disclosed in aforementioned U.S. Pat. Nos. 4,722,248; 4,850,236 and 5,498,195. Systems incorporating this feature are sold by Eaton Corporation under the "Super 10 Top-2" trademark and by Dana Corporation under the "Automate-2" trademark.

To shift out of the "A" position, the operator may simply use the clutch pedal 115, throttle pedal 113 and shift lever 57 to perform a fully manual shift to another ratio. If an assisted lever shift from "A" to eighth (or a lower ratio) is required, the selector rocker 120B may be retained in the "down" position, which will cause the ECU 146 to command the fuel controller 112 and/or splitter actuator 116 to assist the lever or combined lever-and-splitter shift from the engaged "A" ratio (ninth or tenth) to a selected target ratio. Pulses of the selector (and "up" continuing displacements), when in the "A" position, are ignored by the ECU.

In transmission systems such as system 100, and in more automated systems, the system is provided with a signal indicating, or with a means for determining, that a shift in the main transmission section 16A is to be initiated.

According to the present invention, a detent mechanism is provided which will provide a variable resistance to shift rail movement from an engaged position. When the system senses a desire to remain in an engaged ratio, the detent provides a detent force which will provide an exceedingly nigh resistance to shift rail movement which will resist shift lever-induced jumpout. As a shift is not occurring, this will have no adverse effect on shift quality. When an intent to do a lever shift or a shift in progress is sensed, there is no requirement to prevent jumpout and detent resistance or force is minimized to improve shift quality by reducing shift effort. In more automated systems, this will allow smaller shift actuators to be utilized.

Figure 5:
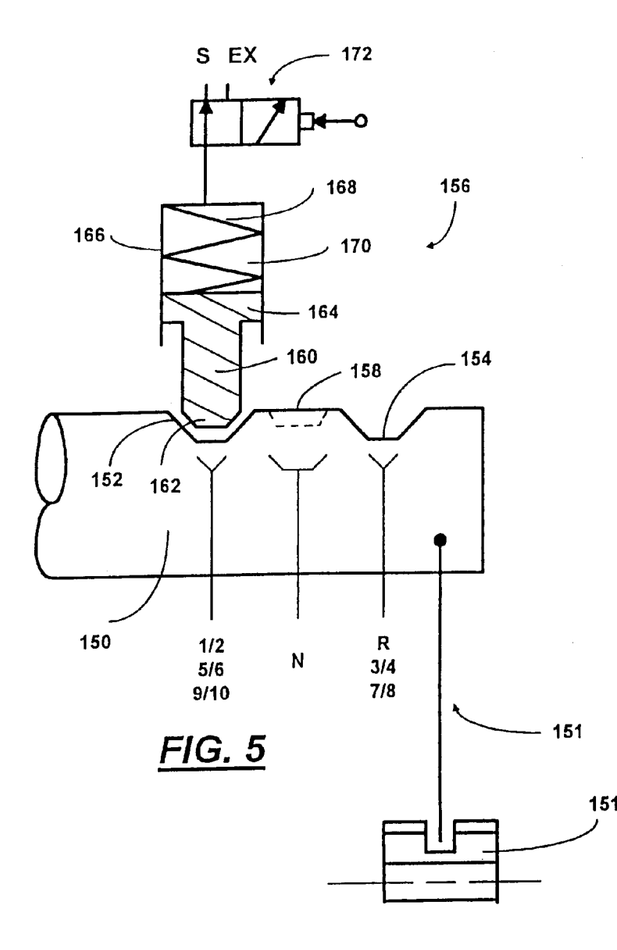
FIGS. 5 and 6 are schematic illustrations of alternate variable resistance shift rail detent mechanisms.

FIG. 5 illustrates one embodiment of a variable shift rail detent mechanism. Shift rail 150 (also called a "shift shaft") has in-gear notches 152 and 154 which will align with a detent mechanism 156 when the transmission is engaged in 1/2, 5/6 or 9/10(A) or in R, 3/4 or 7/8, respectively. A land 158 exists between notches 152 and 154. Alternatively, a small neutral detent (shown in dashed lines) may be utilized.

Shift rail 150 will typically carry one or more shift forks 151 for axially positioning clutch members 151A in engaged or disengaged positions, as is well known in the prior art.

The detent mechanism includes a plunger 160 having tapered tip 162 receivable in the notches and a piston end 164 receivable in a cylinder 166. A light compressor spring 168 biases the plunger downwardly into contact with the notches. The piston and cylinder define a selectively pressurized and exhausted chamber 170 which is controlled by an actuator valve 172 under command from ECU 146.

Upon sensing an intent to shift, chamber 170 is exhausted to minimize the resistance to axial movement of shift rail 150. Upon sensing a desire to remain engaged, the chamber 170 is pressurized to maximize the detent force and, thus, the resistance to axial movement of the shift rail to resist shift l(ever-induced jumpout. An onboard source S of pressurized fluid, such as hydraulic fluid or pressurized air, may be used to pressurize chamber 170.

Figure 6:
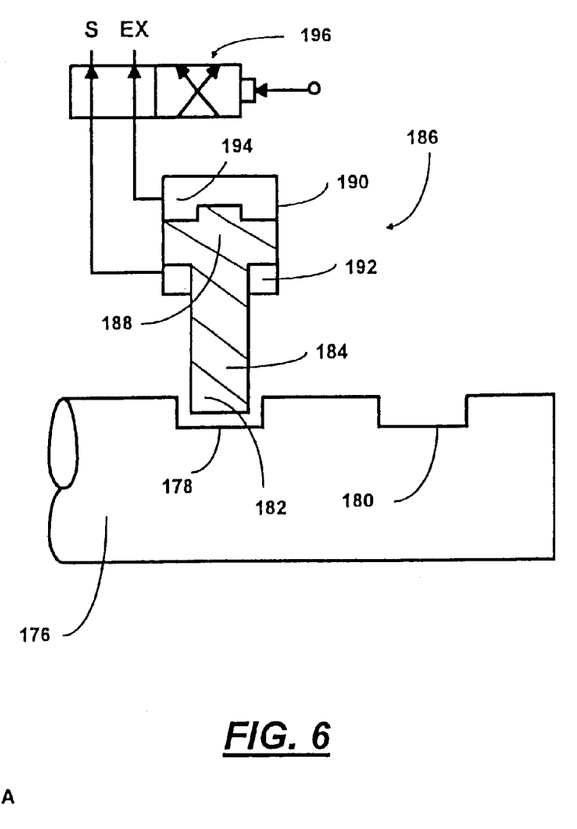
Figure 6A:
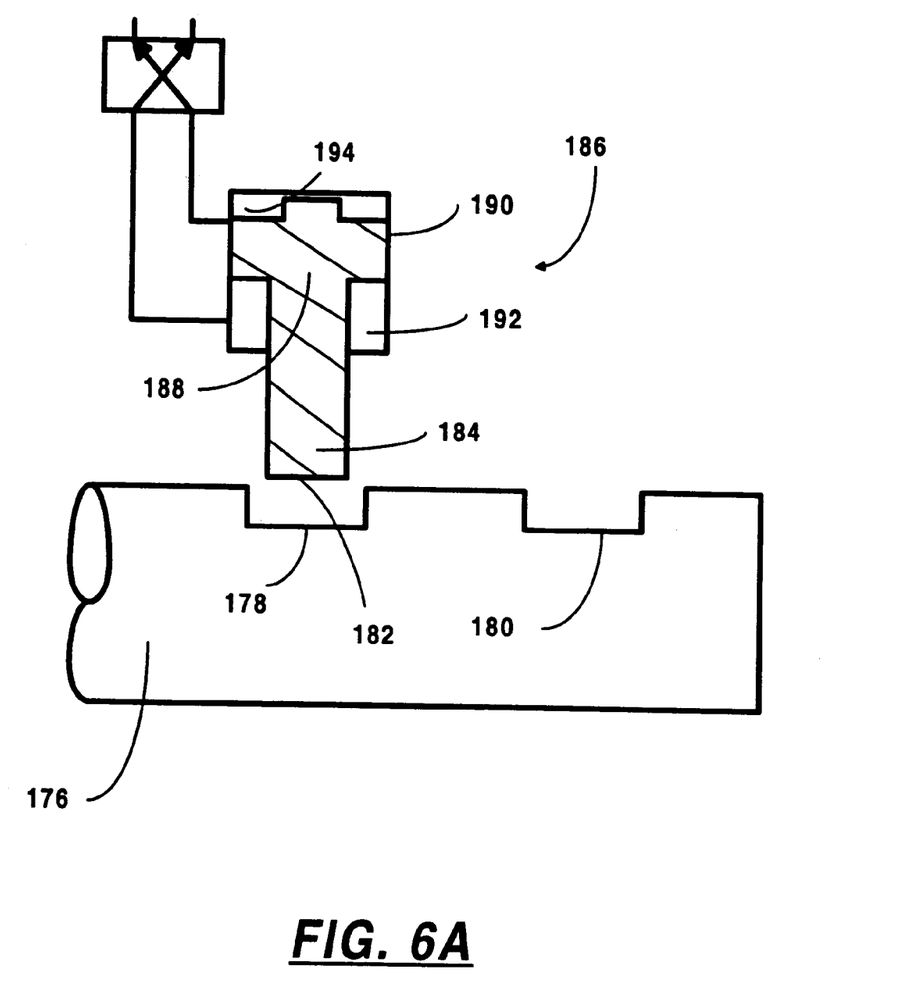
FIG. 6A is a schematic illustration of the detent mechanism of FIG. 6 in a retracted position.

The detent mechanism of FIGS. 6 and 6A is similar to that illustrated in FIG. 5 in that a shift rail is provided with in-gear notches 178 and 180 corresponding generally to notches 152 and 154, respectively. Notches 17E8 and 180, however, are not tapered. The notches 178 and 180 cooperate with a non-tapered tip 182 of a plunger member 184 of a detent mechanism 186. Plunger member 184 includes a two-sided piston portion 188 slidably and sealingly received in a cylinder 190. The piston portion 188 and cylinder 190 define two separate chambers 192 and 194, which are alternately pressurized and exhausted by control valve 196 under command from ECU 146 to cause the plunger to assume an extended or retracted position. The retracted position of the plunger is illustrated in FIG. 6A.

Figure 8:
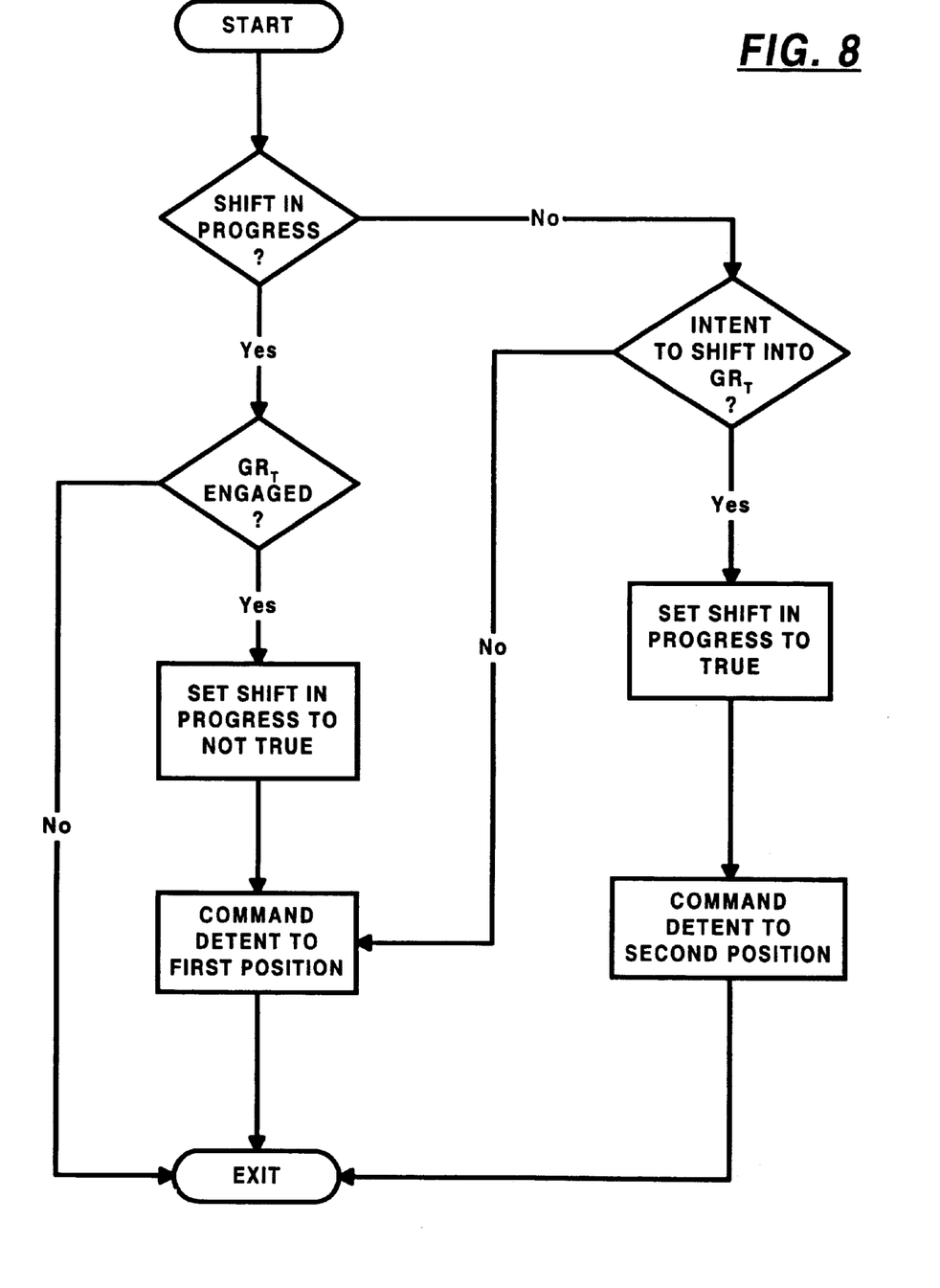
FIG. 8 is a representation, in flow chart format, of the present invention.

The mechanism in FIG. 6 provides a positive resistance to axial movement of the shift rail 176, as opposed to the resilient resistance to axial movement of shift rail 150 provided by the mechanism illustrated in FIG. 5. Both types of mechanisms, and modifications thereof, are suitable for the present invention. FIG. 8 illustrates, in a flow chart format, the method of the present invention.

Figure 7:
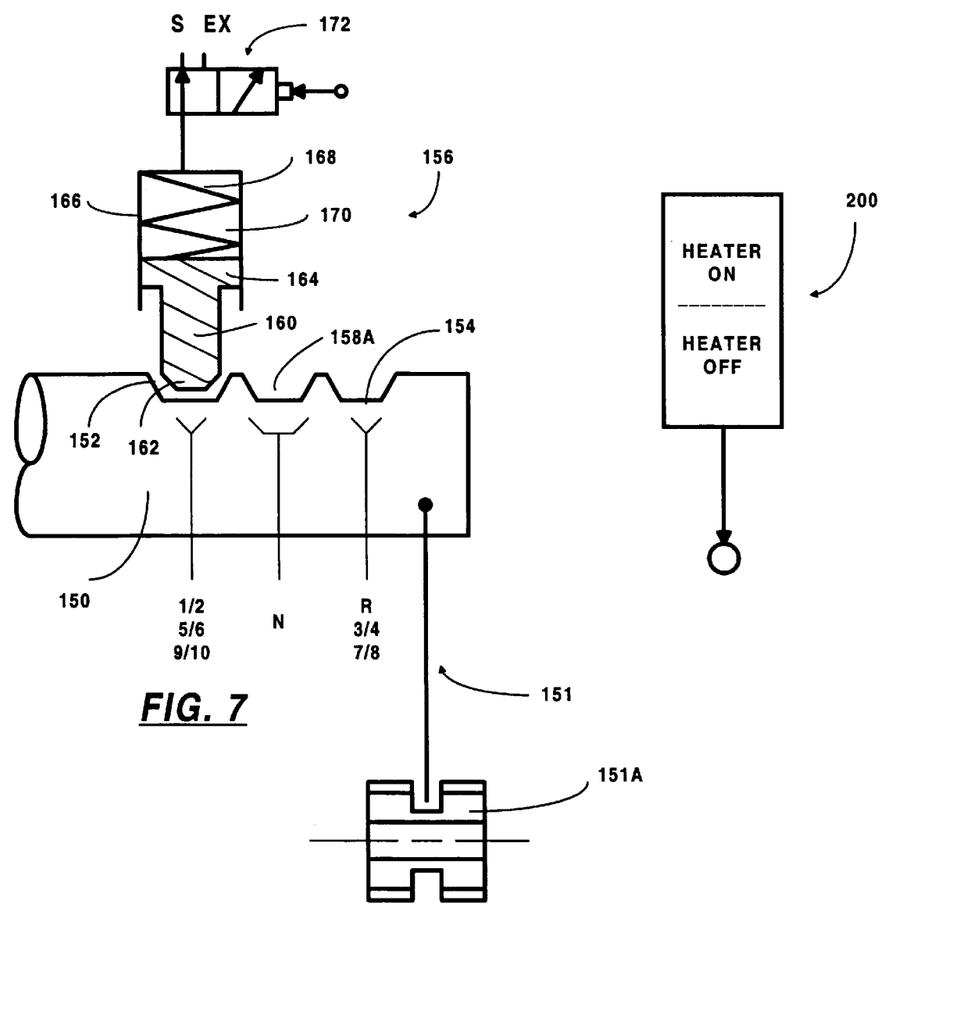
FIG. 7 illustrates a further alternate embodiment of the present invention.

The embodiment illustrated in FIG. 7 is substantially identical to that of FIG. 5, except that neutral detent 158A is intended to positively retain the shift shaft 150 in the neutral condition and a control unrelated to dynamic shifting, such as a heater control, provides a control input. As is known, in a heavy-duty truck, often it is desirable to leave the engine running in neutral for a long period of time to power the heater, the refrigeration unit or the like. Under such conditions, it is very desirable to positively lock the transmission in neutral. Plunger 160 will cooperate with detent 158A to provide such a positive locking.

Although the present invention has been described with a certain degree of particularity, it is understood that the description of the preferred embodiment is by way of example only and that numerous changes to form and detail are possible without departing from the spirit and scope of the invention as hereinafter claimed.

We claim:

1. A transmission system (10) comprising a master friction clutch (14) for drivingly coupling an engine (12) to a compound mechanical transmission (16) including a main section and an auxiliary section, a shift member (150, 176) for moving a selected positive clutch member (151A) in said main section to a selected one of an engaged or a disengaged position and means (120, 146) independent of operation of said shift member and said master friction clutch for sensing a requirement to move said selected positive clutch member from said engaged position to said disengaged position and for providing an intent-to-shift signal indicative thereof, said system characterized by:

a detent mechanism (156/172, 186/196) for providing a selectively variable resistance to movement of said clutch member from said engaged to said disengaged position, said detent mechanism having a first condition for providing a greater resistance to movement of said clutch member from said engaged to said disengaged position and a second condition for applying a lesser resistance to movement of said clutch member from said engaged to said disengaged position, said detent mechanism assuming said second condition upon sensing said intent-to-shift signal.

2. A method for controlling a transmission system comprising a master friction clutch (14) for drivingly coupling an engine (12) to a compound mechanical transmission (16) including a main section and an auxiliary section, a shift member for moving a selected positive clutch member in said main section to a selected one of an engaged or a disengaged position, means independent of operation of said shift member and said master friction clutch for sensing a requirement to move said selected positive clutch member from said engaged position to said disengaged position and for providing an intent-to-shift signal indicative thereof, and a detent mechanism for providing a selectively variable resistance to movement of said clutch member from said engaged to said disengaged position, said detent mechanism having a first condition for providing a greater resistance to movement of said clutch member from said engaged to said disengaged position and a second condition for applying a lesser resistance to movement of said clutch member from said engaged to said disengaged position, said method comprising:

in the absense of said intent-to-shift signal, causing said detent mechanism to assume said first condition, and
   upon sensing said intent-to-shift signal, causing said detent mechanism to assume said second condition.

3. The method of claim 2 wherein said means provides a signal indicative of a target gear ratio and said method further comprises causing said detent mechanism to assume said first condition upon sensing engagement of said target gear ratio.

4. A manually shifted change-gear transmission system comprising a master friction clutch (14) for drivingly coupling an engine (12) to a compound mechanical transmission (16) including a main section and an auxiliary section, a manually operated shift lever for moving a selected clutch member in said main section to a selected one of an engaged or a disengaged position, said transmission system comprising:

means independent of operation of said master friction clutch and manual movement of said shift lever to sense an operator desire to shift said clutch member from said engaged to said disengaged position and to provide a signal indicative thereof, and a detent mechanism for providing a selectively variable resistance to movement of said clutch member from said engaged to said disengaged position, said detent mechanism having a first condition for providing a greater resistance to movement of said clutch member from said engaged to said disengaged position and a second condition for applying a lesser resistance to movement of said clutch member from said engaged to said disengaged position, said detent mechanism assuming said second condition upon sensing said signal.

5. A partially automated transmission system comprising a fuel-controlled engine, an engine controller for controlling fueling of the engine in accordance with command output signals, a compound multiple-speed mechanical transmission having an input shaft driven through a master friction clutch by the engine, an output shaft, a main transmission section shifted by a manual shift lever and an auxiliary section, an operator selector movable to a first position for selection of upshifts to a target ratio and to a second position for selection of downshifts to a target ratio, and a control unit for receiving input signals and processing same according to predetermined logic rules to issue command output signals, said system characterized by:

a detent mechanism for providing a selectively variable resistance to movement of said shift lever from a ratio-engaged to a ratio-disengaged position, said detent mechanism having a first condition for providing a greater resistance to movement of said shift lever from said ratio-engaged to said ratio-disengaged position and a second condition for applying a lesser resistance to movement of said shift lever from said ratio-engaged to said ratio-disengaged position, and said logic rules being effective to determine, independently of operation of said master friction clutch and said shift lever, a driver intent to move said shift lever to said ratio-disengaged position and, upon sensing such intent, causing said detent mechanism to assume said second condition.

6. The transmission system of claim 5 wherein said shift lever is operable to cause axial movement of a shift rail, said detent mechanism comprising a notch in said rail and a detent plunger biased with variable force to engage said notch.

7. The transmission system of claim 6 wherein said notch and said plunger are provided with complementary ramped surfaces.

* * * * *